United States Patent [19]

Ito

[11] Patent Number: 5,416,758
[45] Date of Patent: May 16, 1995

[54] OPTICAL RECORDING/REPRODUCING HEAD ACCESS CONTROLLING APPARATUS FOR AN OPTICAL TYPE INFORMATION RECORDING/REPRODUCING APPARATUS

[75] Inventor: Ken-ichi Ito, Hachioji, Japan

[73] Assignee: Olympus Optical Co., Ltd., Tokyo, Japan

[21] Appl. No.: 50,653

[22] Filed: Apr. 22, 1993

[30] Foreign Application Priority Data

Apr. 22, 1992 [JP] Japan .................................. 4-103035

[51] Int. Cl.$^6$ .............................................. G11B 7/00
[52] U.S. Cl. .................................. 369/44.28; 369/32; 369/58; 369/44.25
[58] Field of Search ................. 369/58, 48, 54, 50, 369/44.27, 44.28, 44.29, 32; 360/77.01, 77.02, 78.06

[56] References Cited

U.S. PATENT DOCUMENTS

| | | | |
|---|---|---|---|
| 4,416,002 | 11/1983 | Oguino et al. | 369/44.27 |
| 4,788,421 | 11/1988 | Ogawa et al. | 369/44.28 |
| 4,805,050 | 2/1989 | Aoyagi et al. | 360/77.2 |
| 4,872,151 | 10/1989 | Smith | 369/32 |
| 4,901,299 | 2/1990 | Nakatsu | 369/44.28 |
| 4,970,350 | 11/1990 | Sander et al. | 369/44.28 |
| 5,047,999 | 9/1991 | van der Meulen | 369/50 |
| 5,146,440 | 9/1992 | Yamaguchi et al. | 369/44.28 |
| 5,220,543 | 6/1993 | Kuroda et al. | 369/44.14 |
| 5,220,547 | 6/1993 | Yasukawa et al. | 369/44.28 |
| 5,329,508 | 7/1994 | Matsueda | 369/44.11 |

FOREIGN PATENT DOCUMENTS

61-260474 11/1986 Japan .
61-260476 11/1986 Japan .
2-302914 12/1990 Japan .

*Primary Examiner*—Georgia Y. Epps
*Assistant Examiner*—Nabil Hindi
*Attorney, Agent, or Firm*—Armstrong, Westerman, Hattori, McLeland & Naughton

[57] ABSTRACT

An optical head access controlling apparatus comprises a speed detecting circuit detecting a moving speed of an optical spot irradiated onto an optical disk and outputting a speed detecting signal, a CPU controlling all of said optical head access controlling apparatus and outputting a crossing track number N which is set when access to a target track starts and outputting an access direction, a track counter outputting a remained track number from the crossing track number N to a target track, a reference speed producing circuit producing a reference speed of an optical head in accordance with a remained track number from the track counter, a first amplifier of a gain K1 amplifying a moving speed detecting signal of an optical spot from a speed detecting circuit, a speed direction designating circuit designating a speed direction by an access direction signal of an optical disk from the CPU, a second amplifier of a gain K2 amplifying a reference speed signal from a reference speed producing circuit, a reference speed direction designating circuit designating a reference speed direction by an access direction signal from the CPU, a track pitch distinguishing device for distinguishing a track pitch of an optical disk and an error detecting circuit producing a speed error signal by output from a reference speed direction designating circuit and speed direction designating circuit.

14 Claims, 4 Drawing Sheets

OPTICAL RECORDING/REPRODUCING HEAD ACCESS CONTROLLING APPARATUS FOR AN OPTICAL TYPE INFORMATION RECORDING/REPRODUCING APPARATUS

BACKGROUND OF THE INVENTION

1. Field of the Invention

The present invention relates to an optical head access controlling apparatus of an optical type information recording/reproducing apparatus for recording information in a track on an information recording medium or reproducing the recorded information using an optical head.

2. Description of the Related Art

Generally, a track is concentrically-circularly or spirally provided in an information optical medium, such as an optical disk. Information is recorded and/or reproduced by making the optical head follow the track. When information is continuously recorded/reproduced in a track, an optical head can always be made to follow a track by performing proper tracking control. However, when random access is carried out, a seeking operation for making an optical head move on a track detached from the optical head is needed. The seeking operation is performed, for example, by an optical head access controlling apparatus described as follows.

FIG. 4 is a block diagram of an optical head access controlling apparatus which has been generally used.

An optical head access controlling apparatus 50 currently in use converges optical beams 52 emitted from a light source (not illustrated) on a track of an optical disk 51 in which a track for recording/reproducing information is provided by means of an objective lens 53 as shown in FIG. 4. The light reflected by the optical disk 51 enters a bisected light receiving device 54. The light source, objective lens 53 and bisected light receiving device 54 are integrated as an optical head 55. The optical head 55 can be moved in the radial direction of the optical disk 51 by means of an optical head actuator 56. Each output of the bisected light receiving device 54 is supplied to a subtracting amplifier 57 and a track error signal 58 is output. The track error signal 58 is supplied to a pulse generating circuit 59 and pulses corresponding to zero crossing are generated. The pulses originated from the pulse generating circuit 59 are supplied to a speed detecting circuit 60. The speed detecting circuit 60 detects a moving speed of an optical spot irradiated onto the optical disk 51 from an input pulse cycle.

Further, the pulse originated from the pulse generating circuit 59 are supplied to a track counter 61. When an access operation starts, the track counter 61 subtracts the number of input pulses from a crossing track number N set by a CPU 62 controlling the whole apparatus and outputs the remaining number of tracks to a target track. The output of the track counter 61 is fed to a reference speed producing circuit 63. The reference speed producing circuit 63 outputs a speed signal in which a speed is decelerated by constant acceleration as the optical spot is approaching the target track. A speed direction designating circuit 64 and reference speed direction designating circuit 65 are switching circuits which switch between reversing and outputting the polarity of the speed detecting signal and reference speed signal which are input, and outputting them as they are. The outputs of the speed direction designating circuit 64 and reference speed direction designating circuit 65 are supplied to an error detecting circuit 66, so that a speed error signal is obtained. The speed error signal is supplied to an amplifier 67 and is amplified, and then, the speed error signal is supplied to the optical head actuator 56. By the aforesaid structure, the access control which makes the optical head 55 move to the target track is performed.

The optical disk access controlling apparatus 50 measures a pulse generating cycle which corresponds to the zero crossing of the track error signal and converts the cycle to speed for detecting the speed at accessing. Therefore, a track pitch for recording/reproducing information previously formed in the optical disk 51 is used as a basis. Further, for generating a reference speed, it is necessary to generate speed signals previously set in accordance with the distance to the target track. However, the distance in this case is obtained by the number of crossing tracks. Accordingly, the track pitch is also used as a basis. Since a track pitch is correctly produced in an ordinary disk, it is not a problem to use a track pitch as a basis for detecting the speed or distance.

However, in order to increase an information recording capacity of an optical disk, a disk having a smaller track pitch than usual has been recently used. In this case, it is desirable that an optical disk apparatus can record/reproduce information for a disk having a wider track pitch than a conventional one in the same manner as the disk having a narrow track pitch.

As mentioned above, a speed detecting circuit or reference speed producing circuit of a conventional access controlling apparatus uses a conventional track pitch as a basis. Therefore, there is a shortcoming in which a disk having a different track pitch cannot be stably access-controlled.

Although the aforesaid shortcoming can be solved if the number of the kinds of the speed detecting circuit and reference speed producing circuit which is the same number of the track pitches of an optical disk are prepared and the speed detecting circuit and reference speed producing circuit are switched with each other, there is a problem in that the size of the circuit must be enlarged.

SUMMARY OF THE INVENTION

The object of the present invention is to provide an optical head access controlling apparatus having a relatively simple circuit which can handle a plurality of optical type recording media having different track pitches.

The optical head access controlling apparatus of the present invention comprises an optical head which irradiates an optical spot onto a desired track on a recording medium provided with a plurality of tracks and which records and/or reproduces information, moving means for moving the optical head in the direction of crossing a track of the recording medium, distinguishing means for distinguishing a track pitch of the recording medium and moving speed controlling means for controlling the moving speed of the optical head by the moving means.

The other characteristics and advantages of this invention will be apparent from the following explanation.

BRIEF DESCRIPTION OF THE DRAWINGS

FIG. 1 is a block diagram showing structure of an optical head access controlling apparatus related to the first embodiment;

DETAILED DESCRIPTION OF THE PREFERRED EMBODIMENTS

Figure 1:
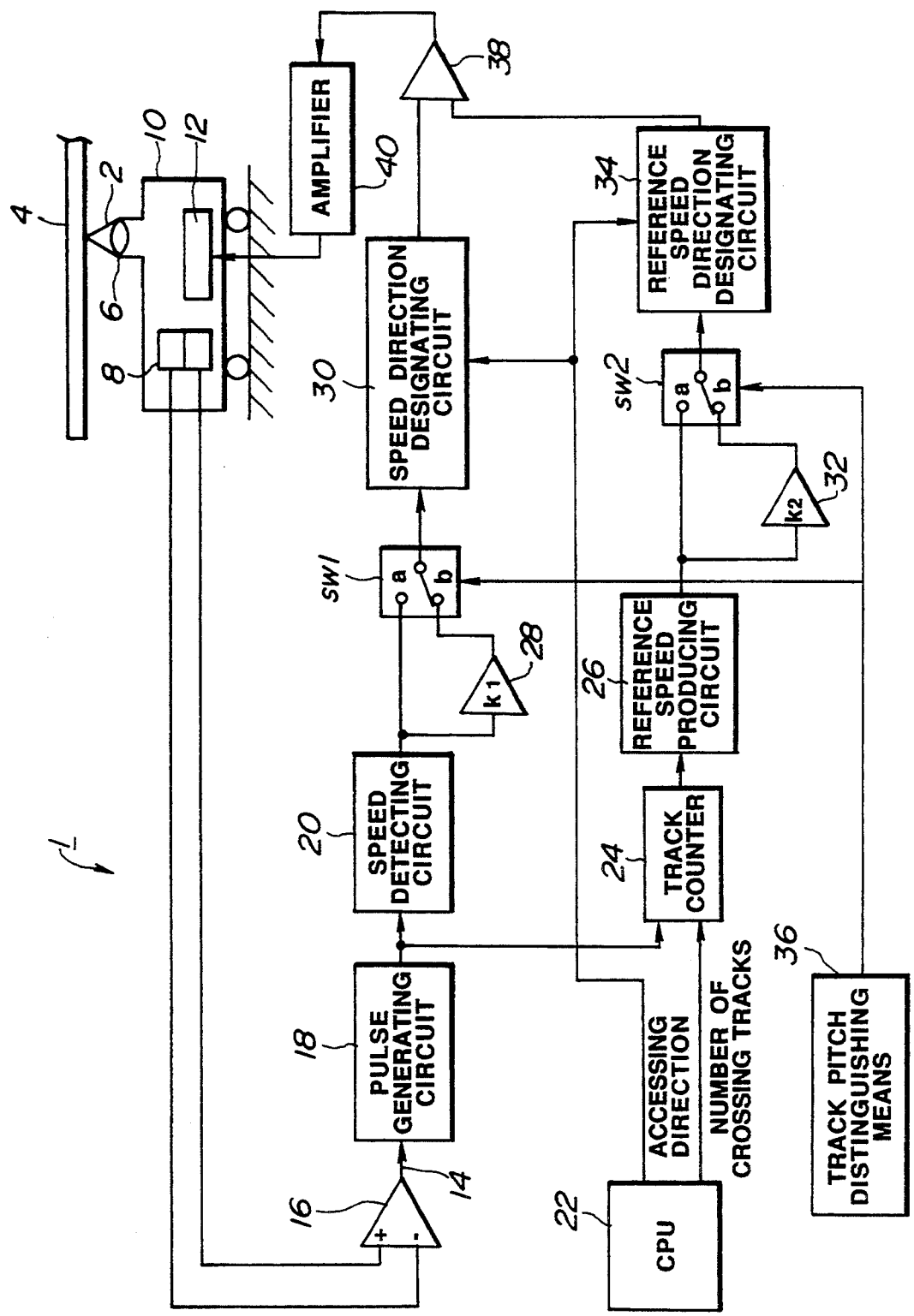
FIG. 1 illustrates a block diagram of the first embodiment of the present invention.

As shown in FIG. 1, an optical head access controlling apparatus 1 of the first embodiment comprises a light source (not illustrated) and an information recording medium for recording/reproducing information inserted into a disk drive apparatus (not illustrated) converting optical beams 2 emitted from the light source and containing the optical head access controlling apparatus 1, optical head access controlling apparatus 1 includes an optical head 10 consisting of a converting light lens 6 forming an optical spot on a track of an optical disk 4 and a bisected light receiving device 8 in which a light receiving surface for photoelectrically converting reflected light from the optical disk 4 is bisected. In the optical head 10, an optical head actuator 12 for making the optical head 10 move in the radius direction of the optical disk 4 is provided.

Further, the optical head access controlling apparatus 1 comprises a subtracting amplifier 16 producing a track error signal 14 by means of each output from a bisected light receiving surface of the bisected light receiving device 8, a pulse generating circuit 18 for inputting the track error signal 14 and generating pulses corresponding to the zero crossing of the track error signal 14, a speed detecting circuit 20 for inputting the pulses from the pulse generating circuit 18 and detecting the moving speed of the optical spot irradiated onto the optical disk 4 from a cycle of the pulse and outputting a speed detecting signal, a CPU 22 for controlling the whole apparatus and outputting a crossing track number N set when an access to a target track starts and the direction of the access, a track counter 24 for subtracting the number of pulses from the pulse generating circuit 18 from the crossing track number N and outputting the number of the tracks remained to the target track, and a reference speed producing circuit 26 for producing the reference speed of the optical head 10 in accordance with the number of the tracks remaining from the track counter 24. The reference speed circuit 26 outputs a reference speed signal which is accelerated to a predetermined speed by constant acceleration when the access to the target track starts and decelerated by constant acceleration as the optical head 10 is approaching the target track.

Further, the optical head access controlling apparatus 1 comprises a first amplifier 28 of a gain K1 (mentioned later) for amplifying a speed detecting signal from the speed detecting circuit 20 a first correcting means, a SW1 for switching between a speed detecting signal from the speed detecting circuit 20 and the output of the first amplifier 28 and outputting a switched signal, a speed direction designating circuit 30 for switching between reversing and outputting a polarity of the output of the SW1, and outputting the output as it is, a second amplifier 32 of a gain K2 (mentioned later) for amplifying a reference speed signal from the reference speed producing circuit 26 as second correcting means, a SW2 for switching between a reference speed signal from the reference speed producing circuit 26 and the output of the second amplifier 32, a reference speed direction designating circuit 34 for switching between reversing and outputting the porality of the output of the SW2, and outputting the output as it is, track pitch distinguishing means 36 for distinguishing the track pitch of the optical disk 4 and switching between the SW1 and SW2 in accordance with the track pitch, an error detecting circuit 38 producing a speed error signal by the output from the reference speed direction designating circuit 34 and the speed direction designating circuit 30, and an amplifier 40 for amplifying a speed error signal from the error detecting circuit 38 and supplying the signal to the optical head actuator 12.

The track pitch distinguishing means 36 distinguishes between a first track pitch P1 and a second track pitch P2 which is a track pitch of the optical disk 4 inserted into a disk drive apparatus (not illustrated) containing the optical head access controlling apparatus 1, for example, by means of a distinguishing hole provided in a cartridge of the optical disk 4. When a track pitch is the first track pitch P1, the SW1 and SW2 are switched to a side a. When a track pitch is the second track pitch P2, the SW1 and SW2 are switched to a side b.

Using the first track pitch P1 and second track pitch P2, the gain K1 of the first amplifier 28 is set as
$K1 = P2/P1$.

In the same manner, the gain K2 of the second amplifier 32 is set as $$K2 = \sqrt{P2/P1} \ .$$

The track pitch distinguishing means 36 distinguishes a track pitch using the distinguishing hole provided in the cartridge in the optical disk 4. However, it is not limited to the distinguishing hole. For example, the track pitch distinguishing means may be formed to distinguish a track pitch by reading a signal in a region where the information of the kinds of the optical disks 4 is recorded.

The operation of the optical head access controlling apparatus 1 formed in this way will be explained.

When the access in which an optical spot for recording/reproducing information moves from a track to another track on the optical disk 4 is controlled, the speed detecting circuit 20 outputs a speed detecting signal, which is correct when a track pitch is P1, on the basis of the interval of the pulses from the pulse generating circuit 18 corresponding to the zero crossing of the track error signal 14, no matter whether the track pitch of the optical disk 4 is P1 or P2. The reference speed producing circuit 26 outputs a reference speed signal, which is correct when a track pitch is P1, on the basis of a count value from the track counter 24.

In the track pitch distinguishing means 36, when the track pitch of the optical disk 4 inserted into an optical disk driving apparatus (not illustrated) is judged as P1, the SW1 and SW2 are switched to the side a and the output of the speed detecting circuit 20 and the output of the reference speed producing circuit 26 are selected to be supplied as they are to the speed direction designating circuit 30 and reference speed direction designating circuit 34, respectively.

Further, in the track pitch distinguishing means 36, when the track pitch of the optical disk 4 is judged as P2, the SW1 and SW2 are switched to the side b and the signal in which the output of the speed detecting circuit 20 is increased the quantity by K1 times by the first amplifier 28 and the signal in which the output of the reference speed producing circuit 26 is increased the quantity by K2 times by the second amplifier 32 are selected and supplied to the speed direction designating circuit 30 and reference speed direction designating circuit 34, respectively.

The speed detecting circuit 20 is capable of detecting a correct speed when a track pitch is P1 of an optical disk. Because the speed detecting circuit 20 outputs a speed of P1/P2 times the quantity of a correct speed for an optical disk having a track pitch P2, the output of the speed detecting circuit 20 is increased by the quantity by K1=P2/P1 times by the first amplifier 28 as mentioned above, so that a correct speed can be obtained and converted into a correct speed detecting signal by means of the speed direction designating circuit 30.

Further, the reference speed producing circuit 26, which generates the reference speed decelerated by constant acceleration while approaching the target track, is formed to output a speed which is proportional to the square root of the number of remained tracks to the target. When a track pitch is P1, the remaining track number correctly corresponds to a distance to the target track. When a track pitch is P2, $\sqrt{P1/P2}$ times the quantity of the correct reference speed is output. Therefore, a correct speed can be obtained by increasing the quantity of the output of the reference speed producing circuit 26 by K2=$\sqrt{P2/P1}$ by the second amplifier 32 and converted into a correct reference speed signal by the reference speed direction designating circuit 34.

In this way, the output of the speed direction designating circuit 30 and the output of the reference speed direction designating circuit 34 which correspond to the track pitch of the optical disk are supplied to the error detecting circuit 38 to obtain a speed error signal. Then, the signal is amplified by the amplifier 40 and supplied to the optical head actuator 12, so that the moving speed of the optical head 10 is controlled.

Accordingly, the optical head access controlling apparatus 1 of the first embodiment obtains a correct speed error which is controlled by distinguishing the track pitch of the optical disk 4 by the track pitch distinguishing circuit 36 and switching between the SW1 and SW2 so that a correct speed error signal is obtained and the optical head actuator is controlled. Thus, the optical head access controlling apparatus 1 can correctly control the access of moving a track to another track by a simple circuit formation for an optical disk having a different track pitch.

Next, a second embodiment will be explained.

An optical head access controlling apparatus of the second embodiment has the same configuration as that of the first embodiment. The second embodiment differs from the first embodiment in correcting a speed detecting signal from a speed detecting circuit by a first correcting means and to correct a speed error signal output from an error detecting circuit by a second correcting means. The rest of the configuration is the same as that of the first embodiment. Therefore, only differences in configuration will be explained. The same reference numerals are given to the same elements in both configurations and their explanation will be omitted.

Figure 2:
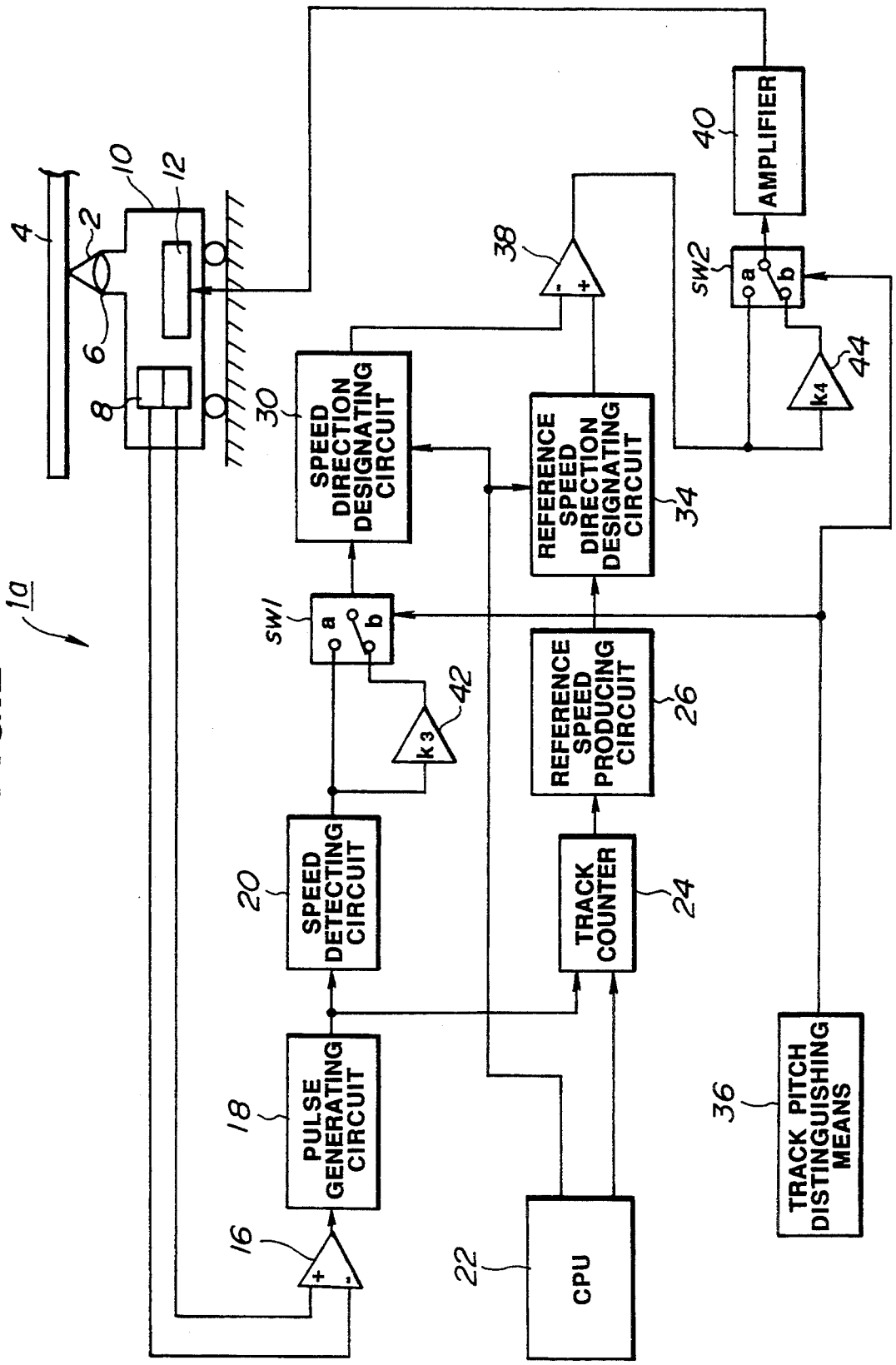
FIG. 2 is a block diagram showing structure of an optical head access controlling apparatus related to the second embodiment.

As shown in FIG. 2, an optical head access controlling apparatus 1a of the second embodiment comprises a first amplifier 42 of a gain K3 (mentioned later) for amplifying a speed detecting signal from the speed detecting circuit 20 as the first correcting means. The optical head access controlling apparatus 1a switches between the speed detecting signal from the speed detecting circuit 20 and the output of the first amplifier 42 by means of a SW 1 and supplies a switched output to a speed direction designating circuit 30. Further, the optical access controlling apparatus 1a comprises a second amplifier 44 of a gain K4 (mentioned later) for amplifying a speed error signal from an error detecting circuit 38. The speed error signal from the error detecting circuit 38 and the output of the second amplifier 44 are switched by means of a SW2 and supplied to an amplifier 40.

In the same manner as that of the first embodiment, when track pitch distinguishing means 36 judges a track pitch of an optical disk 4 as P1, the SW1 and SW2 are switched to a side a. When the track pitch is judged as P2, the SW1 and SW2 are switched to a side b.

Provided that the track pitch of the optical disk 4 distinguished by the track pitch distinguishing means 36 is a first track pitch P1 and second track pitch P2, a gain K3 of the first amplifier 42 is set as $$K3 = \sqrt{P2/P1} .$$

In the same manner, a gain K4 of the second amplifier 44 is set as $$K4 = \sqrt{P2/P1} .$$

Therefore, when the track pitch of the optical disk 4 distinguished by the track pitch distinguishing means 36 is the second track pitch P2, a speed detecting signal is corrected by K3×K4 and a reference speed signal is corrected by K4. The other configurations and operations are the same as those of the first embodiment.

Although the effect of the second embodiment is the same as that of the first embodiment, insertion positions of the first and second correcting means for correcting track pitches in an access controlling system are different.

Next, the third embodiment will be explained.

An optical head access controlling apparatus of the third embodiment is the same as that of the first embodiment. The third embodiment differs from the first embodiment in the correction of a reference speed signal from a reference speed producing circuit by a first correcting means and the correction of an error detecting signal from an error detecting circuit by a second correcting means. The other configurations are the same as that of the first embodiment. Therefore, only the differences in configuration will be explained. The same reference numerals are given to the same configurations and the explanation will be omitted.

Figure 3:
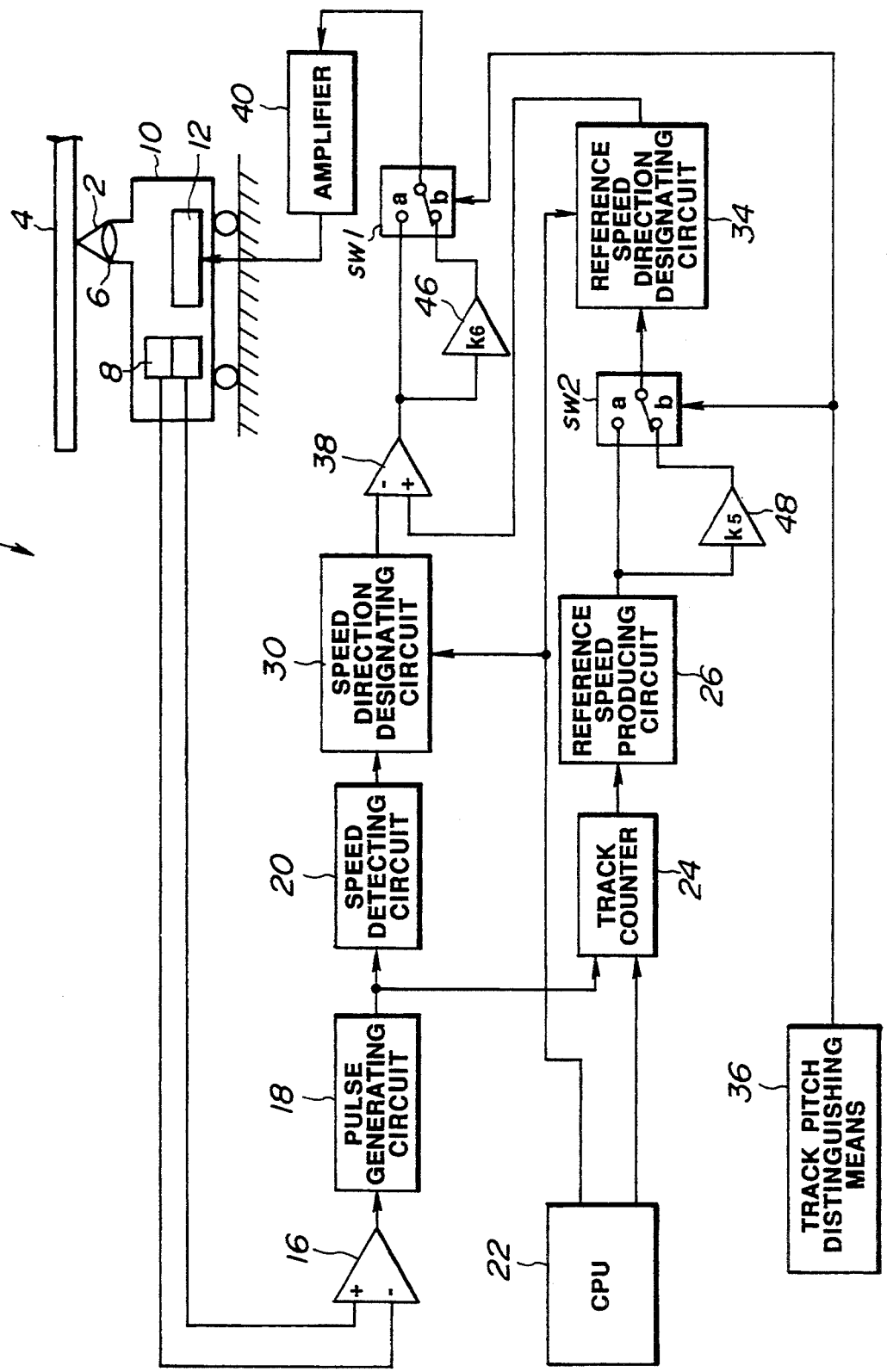
FIG. 3 is a block diagram showing structure of an optical head access controlling apparatus related to the third embodiment.
Figure 4:
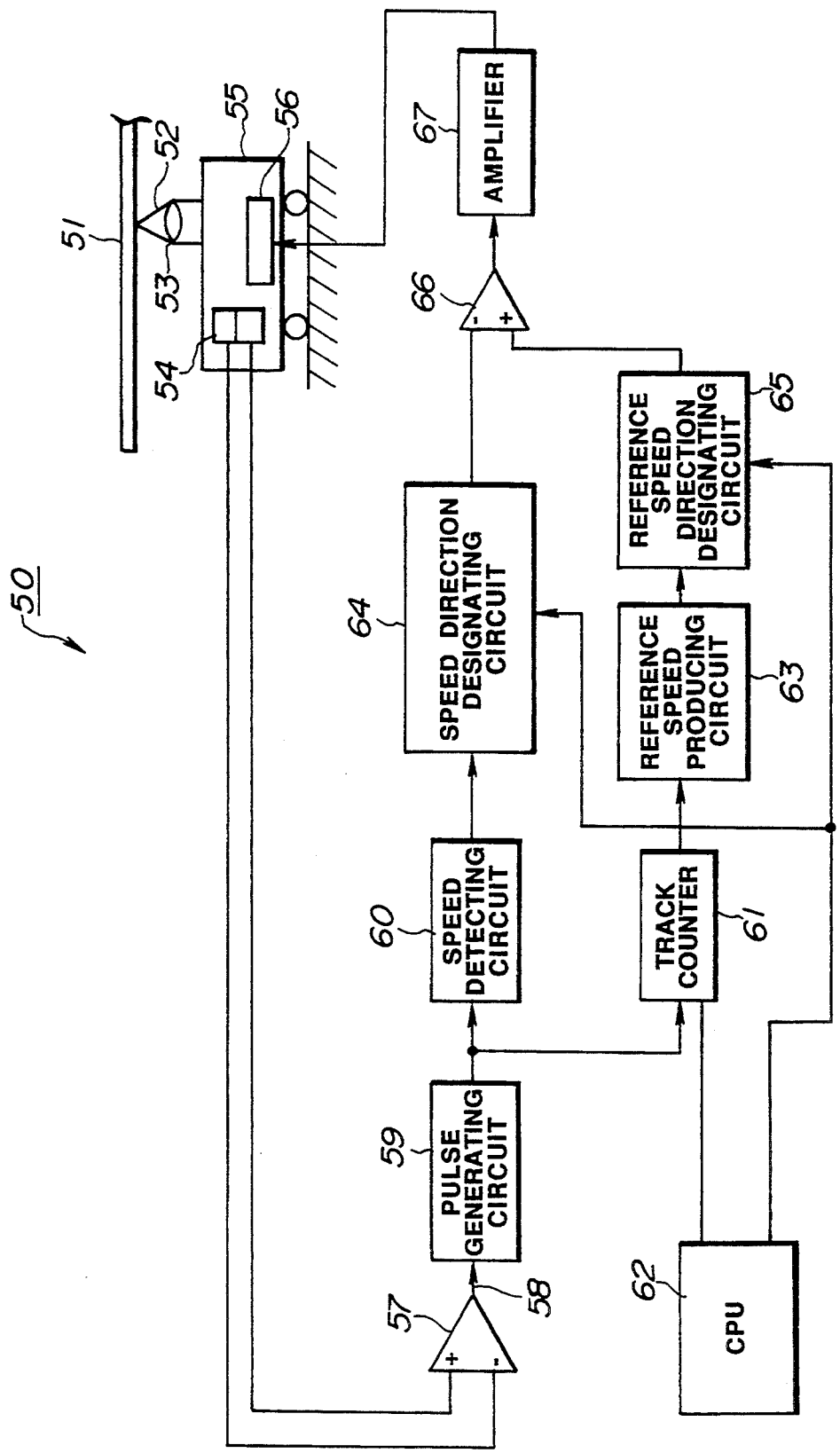
FIG. 4 is a block diagram showing structure of an optical head access controlling apparatus related to the prior art.

As shown in FIG. 3, an optical head access controlling apparatus 1b of the third embodiment comprises a first amplifier 48 of a gain K5 (mentioned later) for amplifying a reference speed signal from a reference speed producing circuit 26 as the first correcting means.

The optical head access controlling apparatus 1b switches between a reference speed signal from the reference speed producing circuit 26 and the output of the first amplifier 46 by means of a SW2 and supplies a switched output to a reference speed direction designating circuit 34. Further, the optical head access controlling apparatus 1b comprises a second amplifier 46 of a gain KS (mentioned later) for amplifying the speed error signal from an error detecting circuit 38. The speed error signal from the error detecting circuit 38 and the output of the second amplifier 44 are switched by means of the SW2 and supplied to an amplifier 40.

In the same manner as that of the first embodiment, when track pitch distinguishing means 36 judges a track pitch of the optical disk 4 as P1, the SW1 and SW2 are switched to a side a. When the track pitch is judged as P2, the SW1 and SW2 are switched to a side b.

Provided that the track pitch of the optical disk 4 distinguished by the track pitch distinguishing means 36 is a first track pitch P1 and second track pitch P2, a gain K5 of the first amplifier 48 is set as $$K5 = \sqrt{P1/P2} .$$

In the same manner, the gain K5 of the second amplifier 46 is set as
K6=P2/P1.

In other words, K5 is equal to the value of the square root of the multiplicative inverse of K6.

Accordingly, when the track pitch of the optical disk 4 distinguished by the track pitch distinguishing means 36 is the second track pitch P2, a speed detecting signal is corrected by the K6 and a reference speed signal is corrected by K5×K6. The other configurations are the same as that of the first embodiment.

Although the effect of the third embodiment is the same as that of the first embodiment, insertion positions of the first and second correcting means for correcting track pitches in an access controlling system are different.

The optical disk 4 used as the information recording medium of each of the aforesaid embodiments may be one of an exclusive use of regenerating optical disk, additional writing type optical disk, reversible type phase changing optical disk and photoelectro-magnetic disk. In addition, the information recording medium is not restricted to an optical disk and may be an optical card. The same effect can be obtained by making an optical card driving apparatus contain the optical head access controlling apparatus of each embodiment.

Further, there are two kinds of track pitches of optical disks as information recording media of the aforesaid embodiments. However, the track pitches are not restricted to two kinds and also may be easily formed to accord with three kinds of track pitches or more by preparing a gain of a correcting amplifier in accordance with the kind of optical disks.

Further, a correction can be made on the basis of a track pitch by hardware, such as an amplifier. However, a correction may be made not only by the hardware, but also by software. For example, a speed detecting signal and reference speed signal are A/D-converted and corrected on the basis of a track pitch of a recording medium by means of the software. Thus, a speed error signal is obtained and D/A-converted and then supplied to an amplifier, so that a moving speed of an optical head is controlled.

In the present invention, it is apparent that working modes different in a wide range can be formed on the basis of the invention without departing from the spirit and scope of the invention. The invention is not restricted by its specific working mode except that it is limited by the appended claims.

What is claimed is:

1. An optical head access controlling apparatus comprising:
   an optical head irradiating an optical spot onto a desired track on a recording medium provided with a plurality of tracks and recording and/or reproducing information;
   moving means for moving said optical head in a crossing direction of tracks of said recording medium;
   distinguishing means for distinguishing an actual track pitch of said recording medium wherein said actual track pitch consists of either a predetermined first track pitch or a predetermined second track pitch; and
   moving speed controlling means for controlling a moving speed of said optical head by said moving means using said distinguishing means;
   wherein said moving speed controlling means comprises:
   speed detecting means for detecting a speed of said optical spot moving across said plurality of tracks for producing a speed detecting signal,
   reference signal producing means for producing a reference speed signal designating a speed of said optical spot moving across said plurality of tracks, and
   correcting means for correcting at least one of said speed detecting signal and said reference speed signal based on the actual track pitch of said recording medium distinguished by said distinguishing means;
   wherein said correcting means comprises:
   first correcting means for correcting said speed detecting signal based on the track pitch of said recording medium distinguished by said distinguishing means,
   second correcting means for correcting said reference speed signal based on the actual track pitch of said recording medium distinguished by said distinguishing means, and difference detecting means for detecting a difference between output of said first correcting means and output of said second correcting means;
   wherein said first correcting means comprises:
   first coefficient multiplying means for multiplying said speed detecting signal by at least a predetermined first coefficient, and
   wherein second correcting means comprises:
   said coefficient multiplying means for multiplying said reference speed signal by at least a predetermined second coefficient.

2. The optical head access controlling apparatus according to claim 1, wherein said first correcting means comprises:
   first switching means for switching between said speed detecting signal and said speed detecting signal multiplied by the first coefficient and outputting a switched signal, and
   wherein said second correcting means comprises:
   second switching means for switching between said reference speed signal and said reference speed signal multiplied by the second coefficient and outputting a switched signal.

3. The optical head access controlling apparatus according to claim 1 or 2, wherein at least one of said first coefficient multiplying means and said second coefficient multiplying means is an amplifying means for amplifying a signal by a predetermined gain.

4. The optical head access controlling apparatus as in claim 1 or 2, wherein said first coefficient has a value which is a ratio of said second track pitch to said first track pitch.

5. The optical head access controlling apparatus according to claim 4, wherein said second coefficient has a value equal to the square root of the value of said first coefficient.

6. An optical head access controlling apparatus comprising:
an optical head irradiating an optical spot onto a desired track on a recording medium provided with a plurality of tracks and recording and/or reproducing information;
moving means for moving said optical head in a crossing direction of tracks of said recording medium;
distinguishing means for distinguishing an actual track pitch of said recording medium wherein said actual track pitch consists of either a predetermined first track pitch or a predetermined second track pitch; and
moving speed controlling means for controlling a moving speed of said optical head by said moving means using said distinguishing means;
wherein said moving speed controlling means comprises:
speed detecting means for detecting a speed of said optical spot moving across said plurality of tracks for producing a speed detecting signal,
reference signal producing means for producing a reference speed signal designating a speed of said optical spot moving across said plurality of tracks, and
correcting means for correcting at least one of said speed detecting signal and said reference speed signal based on the actual track pitch of said recording medium distinguished by said distinguishing means;
detecting means for detecting a difference between an output of said first correcting means and one of said speed detecting signal and said reference speed signal which are not corrected by said first correcting means; and
second correcting means for correcting an output of said difference detecting means on a basis of the actual track pitch of said recording medium distinguished by said distinguishing means,
wherein said first correcting means comprises:
first coefficient multiplying means for multiplying one of said speed detecting signal and said reference speed signal by at least a predetermined first coefficient, and
wherein said second correcting means comprises:
second coefficient multiplying means for multiplying an output of said difference detecting means by at least a predetermined second coefficient.

7. The optical head access controlling apparatus according to claim 6, wherein said first correcting means comprises:
first switching means for switching between one of said speed detecting signal and said reference speed signal multiplied by a first coefficient and one of said speed detecting signal and said reference speed detecting signal multiplied by the first coefficient and outputting a switched signal; and
wherein said second correcting means comprises:
second switching means for switching between an output of said difference detecting means and output of said difference detecting means multiplied by the second coefficient and outputting a switched signal.

8. The optical head access controlling apparatus according to claim 6 or 7, wherein at least one of said first coefficient multiplying means and said second coefficient multiplying means is amplifying means for amplifying a signal using a predetermined gain.

9. The optical head access controlling apparatus according to claim 6 or 7, wherein said first coefficient and said second coefficient are equal in a case where a signal corrected by said first correcting means is said speed detecting signal.

10. The optical head access controlling apparatus according to claim 1 or claim 6, wherein said recording medium is an optical card.

11. The optical head access controlling apparatus according to any one of claims 1, 2, 6 or 7, wherein said discriminating means discriminates the presence or absence of a distinguishing hole provided in a housing of said recording medium.

12. The optical head access controlling apparatus according to claim 6 or 7, wherein both said first coefficient and said second coefficient each have a value equal to the square root of the value of a ratio of said second track pitch to said first track pitch.

13. The optical head access controlling apparatus as in claim 6 or 7, wherein said second coefficient has a value which is a ratio of said second track pitch to said first track pitch.

14. The optical head access controlling apparatus according to claim 13, wherein said first coefficient has a value equal to the square root of a multiplicative inverse of said second coefficient in a case where a signal corrected by said first correcting means is said reference speed signal.

* * * * *